United States Patent [19]

Braun et al.

[11] 4,432,448

[45] Feb. 21, 1984

[54] CONVEYOR TROUGH FOR A SCRAPER CHAIN CONVEYOR

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 334,073

[22] Filed: Dec. 23, 1981

[30] Foreign Application Priority Data

Dec. 27, 1980 [DE] Fed. Rep. of Germany ....... 3049253

[51] Int. Cl.³ .............................................. B65G 19/28
[52] U.S. Cl. ................................................... 198/735
[58] Field of Search ........................ 198/735, 861, 836; 299/43

[56] References Cited

U.S. PATENT DOCUMENTS 4,026,407  5/1977  Georg .............................. 198/861 X

*Primary Examiner*—Joseph E. Valenza
*Assistant Examiner*—Dennis Williamson
*Attorney, Agent, or Firm*—McGlew and Tuttle

[57] ABSTRACT

A conveyor trough for a scraper chain conveyor comprises a sheet metal bracket which is adapted to be secured to one side of the side wall of the conveyor trough, namely the waste side. The sheet metal bracket has an outwardly bent cover leg. An attached bracket is secured to the inside surface of the metal bracket on the side facing the conveyor trough and it is made of a resiliently bending material which projects upwardly from the cover leg and has a loop forming bend at its top forming the upper edge thereof and an outwardly extending stabilizing leg which is propped against the cover leg of the metal bracket. The stabilizing leg is advantageously bent back toward the vertical, so that intermediate its height it forms a bend which engages over a sectional strip to hold the strip between it and the vertical interior leg portion of the resiliently bending metal bracket. The sheet metal strip has a concavely recessed portion on its side adjacent the stabilizing leg into which the stabilizing leg bears so that its lower end is curved outwardly and overlies the cover leg and is propped against a stop strip secured along the outer edge of the cover leg.

7 Claims, 2 Drawing Figures

CONVEYOR TROUGH FOR A SCRAPER CHAIN CONVEYOR

FIELD AND BACKGROUND OF THE INVENTION

This invention relates in general to conveyors and in particular to a new and useful conveyor trough for a scraper chain conveyor having a resiliently bending attached bracket thereon which runs along a side thereof.

Known are conveyor troughs for scraper chain conveyors assembled of trough lengths and corresponding bracket lengths, in which the attached brackets, serving the purpose of increasing the filling capacity by enlarging the cross section upwardly are simply formed by vertically extending conveyor belt lengths attached to the metal bracket. These flat-like conveyor bracket lengths are disadvantagous in that their upper edges tend to tear and fray, for example if the roof supports temporarily weigh thereupon during the advance and underpinning work. In addition, instability of the conveyor belt lengths as resiliently bending attachments is disturbing, since due to this instability, the filling volume can only slightly been larged, and there is not sufficient stability for temporarily bracing the roof supports thereon. The invention tends to eliminate these drawbacks.

SUMMARY OF THE INVENTION

The invention is directed to a conveyor trough of the above mentioned kind equipped with resiliently bending attached brackets which, while remaining sufficiently elastic in bending, are substantially more stable and have a longer life, and, in addition, can be folded down manually at any location.

In accordance with the invention a conveyor trough for a scraper chain conveyor comprises a sheet metal bracket which is adapted to be secured at the waste side of the side wall of the trough and which has a wall with an inside facing the trough and an upper portion with an outwardly bent cover leg. An attached bracket is secured on the inside of the metal bracket and made of a resilient bending material and projects upwardly from the cover leg of the metal bracket. The attached bracket has a loop forming bend forming the upper edge thereof and a stabilizing leg extending outwardly over the cover leg and being propped against the cover leg.

With the inventive construction, the attached bracket is doubled, and, consequently, stiffer, even if it is made from a conveyor belt or a similar resiliently bending material. That is, both the section modulus and the zone of the bend are increased due to the formation of a loop, and the stability is augmented by the provision that the stabilizing leg is propped against a metal support bracket. A tearing or fraying of the upper edge of the attached bracket is virtually prevented by the inventive provision of the bend, and, in addition, the stability needed for temporarily holding up roof supports, and also the sufficient flexibility, are maintained. Due to this stability and the greater section modulus, the transverse rigidity of the inventive attached bracket is also increased; i.e., the horizontal loading capacity is improved to an extent such that, as compared to conventional simple conveyor belt lengths and with an equal height of the brackets, the filling cross-section can considerably be augmented. As a result, an attached bracket withstanding high loads and stresses and made from a resiliently bending material is obtained with relatively simple means. The resiliently bending attached bracket can be folded down, toward the waste side, at any desired location, thereby making it possible to get to the coal face side, or get room for a manipulation in this direction. These are the substantial advantages of the invention.

In accordance with a feature of the invention, the loop of the stabilizing leg is formed by bending the stabilizing bracket backwardly upon itself. The inside substantially vertical leg is secured on the inside of the bracket of the chain conveyor and the outside stabilizing leg is bent within a curved recess of a sectional strip which is attached along the conveyor side between the vertical interior leg and the stabilizing leg of the attached bracket.

Due to the inclined extension of the end portion of the stabilizing leg relative to the vertical securing leg of the attached bracket, the bracing effect against the conveyed material is increased. The angle of inclination of the leg portion propped against the cover leg of the metal bracket is determined by the cross-sectional shape of the sectional strip.

In accordance with another feature of the invention the sectional strip is designed as a sheet metal strip which is concavely recessed on the side of the stabilizing leg and is formed within an enlarging leg which engages over the stabilizing leg of the attached bracket. The invention further provides a strip which is secured to the cover leg of the metal bracket and extends in the longitudinal direction of the conveyor and serves as a stop for the free end portion of the stabilizing leg, whereby a particularly satisfactory propping is obtained. This free end portion of the stabilizing leg may be provided with recesses or apertures. Then, if the resiliently bending attached bracket is manually folded down to the waste side, the free end portion of the stability leg slips uniformly over and below the cover leg of the metal bracket, that is upon lifting this free end portion and thus the stability leg and pulling it over the stop strip by means of an auxiliary tool engaging the recesses in the end portion. This brings the attached bracket into a position in which it can particularly easily be folded down. Advantageously, the stabilizing leg is clamped between two sectional strips which are shaped to ensure a corresponding inclination of the free end portion of the stabilizing leg.

Accordingly, it is an object of the invention to provide a conveyor trough for a scraper chain conveyor which comprises a sheet metal bracket which is adapted to be secured to the one side of the trough and has a wall with an inside facing the trough and an upper portion with an outwardly bent cover leg and including an attached bracket secured to the inside of the metal bracket and made of a resiliently bending material and projecting upwardly from the cover leg and having a loop forming bend which forms the upper edge of the attached bracket and an outwardly extending stabilizing leg which is propped against the cover leg of the metal bracket.

A further object of the invention is to provide a conveyor trough which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
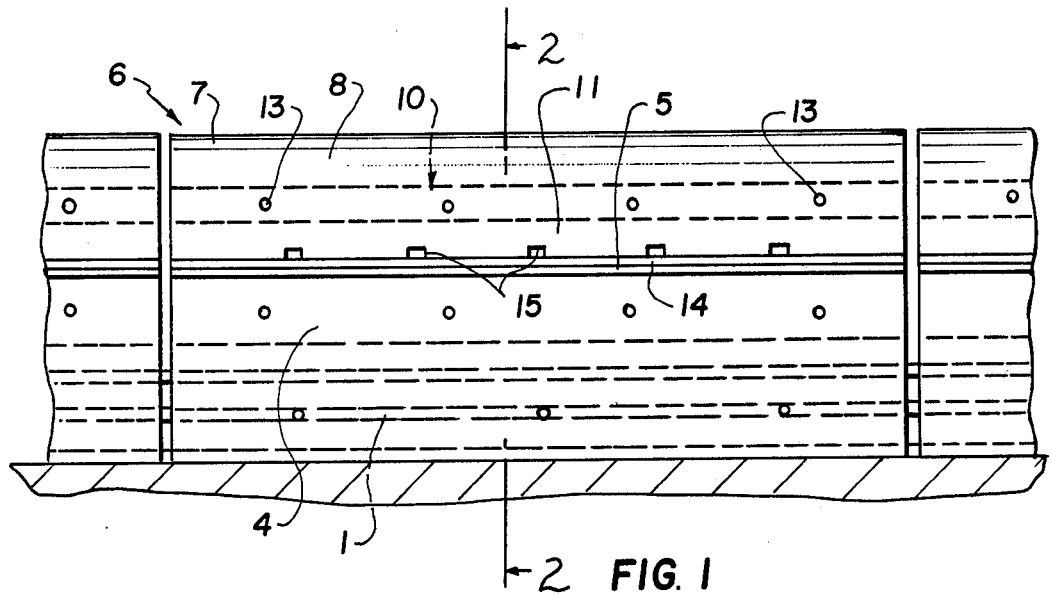
FIG. 1 is a partial side elevation of a conveyor trough constructed in accordance with the invention.

Referring to the drawings in particular, the invention embodied therein comprises a conveyor trough 1 for a scraper chain conveyor 2 or the like, equipped with a sheet metal bracket or side wall 4 which is secured at the waste side to a wall 3 of the trough 1 and has an outwardly bent upper portion forming a cover leg 5, and with an attached bracket 6 made of a resiliently bending material, which is secured inside to metal bracket 4 and projects upwardly therefrom. In a conventional manner, conveyor trough 1, metal bracket 4, and attached bracket 6 are designed as individual lengths to be assembled to a complete conveyor. The resiliently bending attached bracket 6 is a structural element doubled upon itself, and a loop portion or bend 7 forms the upper edge thereof. At the bend 7, a loop is formed and a downwardly extending free or stabilizing leg 8 is braced against the cover leg 5 of metal bracket 4. To form the loop, the downwardly extending stabilizing leg 8 is bent back, toward a vertical, securing leg 9 of attached bracket 6 and at a predetermined level below bend 7, and secured at this location to vertical leg 9 through an interposed sectional strip 10 which extends in the longitudinal direction of the bracket.

A sectional strip 10 is also made in corresponding lengths, and is secured between the leg 9 and leg 8. A free end portion 11 of the stabilizing leg 8 is spread away from vertical leg 9 due to the provided cross-sectional shape of sectional strip 10, and bears in this obliquely upright position against cover leg 5 of metal bracket 4. Sectional strip 10 is designed as a metal strip which is recessed to form lengthwise a concavity on its side remote from vertical leg 9 and thereby a lower enlarging portion 12 by which the free end portion 11 of stabilizing leg 8 is caused to spread away from leg 9. In its inwardly bent portion, stabilizing leg 8 of attached bracket 6 along with sectional strip 10 is secured to vertical leg 9 in a conventional manner by bolts 13, with the interposition of another sectional strip 12 having a cross-section conformable to the concavity of sectional strip 10, so that leg 8 is clamped to leg 9 in a manner guarding the material from injury.

Figure 2:
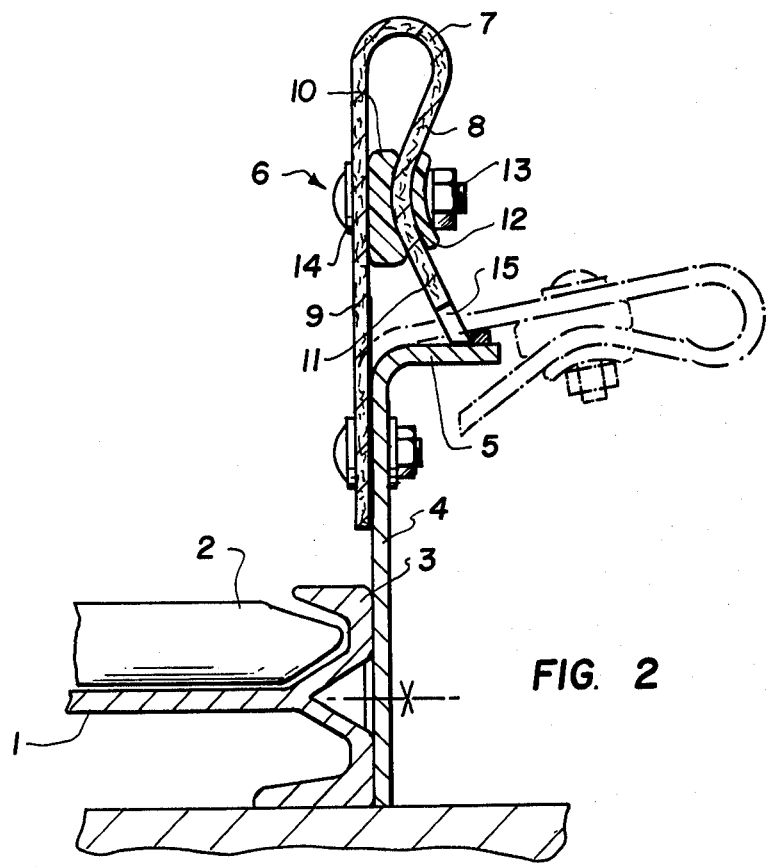
FIG. 2 is a section taken along the line 2—2 of FIG. 1.

To improve the bracing, a lengthwise extending stop strip 14 is provided on cover leg 5 of metal bracket 4, to prop the end portion 11 of stabilizing leg 8 thereagainst. At the edge of this end portion 11, leg 8 is provided with longitudinally spaced recesses 15 for engaging auxiliary tools and thus facilitate the lifting of leg 8 in instances where it is desired to fold attached bracket 6 down at the waste side. The fold-down position of bracket 6 is indicated in dotted lines in FIG. 2.

While a specific embodiment of the invention has been shown and described in detail to illustrate the application of the principles of the invention, it will be understood that the invention may be embodied otherwise without departing from such principles.

What is claimed is:

1. A conveyor trough for a scraper chain conveyor comprising a sheet metal bracket which is adapted to be secured along the side wall of the trough and which has a wall with an inside facing the trough and an upper portion with an outwardly bent cover leg, and an attached bracket secured to the inside of the metal bracket and made of a resiliently bending material and projecting upwardly from said cover leg of said metal bracket, said attached bracket having a loop forming bend forming the upper edge thereof, and an outwardly extending stabilizing leg propped against said cover leg of said metal bracket.

2. A conveyor trough according to claim 1, wherein said stabilizing leg is bent back toward said vertical securing leg of said attached bracket at a predetermined distance below said loop forming bend, at least one sectional strip disposed between said stabilizing leg and said vertical securing leg, said stabilizing leg having a free lower end portion which is spread away from said vertical leg standing upright on said cover leg.

3. A conveyor trough according to claim 2, wherein said sectional strip comprises a sheet metal strip having an outer concavely recessed space facing said stabilizing leg, said stabilizing leg being disposed in and conformed to the curvature of said recess so as to be spread outwardly and downwardly.

4. A conveyor trough according to claim 3, including bolt means securing said stabilizing leg in said sectional strip to said vertical leg.

5. A conveyor trough according to claim 4, including a longitudinally extending stop strip exposed on said cover leg against which the lower end of said stabilizing leg bears.

6. A conveyor trough according to claim 1, wherein said stabilizing leg has a free edge with a plurality of longitudinally spaced recesses defined thereon.

7. A conveyor trough according to claim 1, including a sectional strip disposed between said stabilizing leg and said vertical leg and a enlarging leg overlying said stabilizing leg, and clamping means clamping said enlarging strip and said sectional strip to said vertical leg.

* * * * *